United States Patent
Atzmon et al.

(10) Patent No.: US 9,098,452 B2
(45) Date of Patent: Aug. 4, 2015

(54) SELECTING FILES TO BACKUP IN A BLOCK LEVEL BACKUP

(75) Inventors: Hilla Atzmon, Hafia (IL); Alex Gantman, Hafia (IL); Adik Sokolovski, Kiryat Tivon (IL); Michael Sternberg, Hafia (IL)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 13/330,596

(22) Filed: Dec. 19, 2011

(65) Prior Publication Data

US 2013/0159646 A1 Jun. 20, 2013

(51) Int. Cl.
*G06F 13/00* (2006.01)
*G06F 11/14* (2006.01)

(52) U.S. Cl.
CPC ........ *G06F 11/1451* (2013.01); *G06F 11/1466* (2013.01); *G06F 11/1469* (2013.01); *G06F 2201/815* (2013.01)

(58) Field of Classification Search
CPC combination set(s) only.
See application file for complete search history.

(56) References Cited

U.S. PATENT DOCUMENTS

| | | | |
|---|---|---|---|
| 5,819,292 A | 10/1998 | Hitz et al. | |
| 6,665,779 B1 * | 12/2003 | Polfer et al. | 711/162 |
| 6,959,313 B2 | 10/2005 | Kapoor et al. | |
| 7,047,380 B2 | 5/2006 | Tormasov et al. | |
| 7,069,402 B2 | 6/2006 | Coulter et al. | |
| 7,284,019 B2 | 10/2007 | Adkins et al. | |
| 7,287,045 B2 | 10/2007 | Saika et al. | |
| 7,756,833 B2 | 7/2010 | Van Ingen et al. | |
| 7,831,789 B1 | 11/2010 | Per et al. | |
| 7,937,547 B2 | 5/2011 | Liu et al. | |
| 7,941,406 B2 | 5/2011 | Sudhakar | |
| 7,953,948 B1 | 5/2011 | Dyatlov et al. | |
| 8,200,637 B1 * | 6/2012 | Stringham | 707/670 |
| 8,433,864 B1 * | 4/2013 | Narayanan | 711/162 |
| 2004/0260894 A1 * | 12/2004 | Keohane et al. | 711/162 |
| 2005/0027956 A1 * | 2/2005 | Tormasov et al. | 711/162 |
| 2005/0138312 A1 | 6/2005 | Kubo et al. | |
| 2006/0123211 A1 * | 6/2006 | Derk et al. | 711/162 |
| 2008/0034016 A1 * | 2/2008 | Cisler et al. | 707/204 |
| 2009/0300080 A1 * | 12/2009 | Stringham | 707/204 |
| 2010/0077165 A1 | 3/2010 | Lu et al. | |
| 2010/0179941 A1 | 7/2010 | Agrawal et al. | |
| 2010/0306174 A1 | 12/2010 | Otani | |
| 2011/0191555 A1 * | 8/2011 | Narayanan | 711/162 |
| 2012/0016841 A1 * | 1/2012 | Karonde et al. | 707/641 |
| 2013/0080397 A1 * | 3/2013 | Payne et al. | 707/681 |

OTHER PUBLICATIONS

Wikipedia, "The Story of 3.0 File and Folder", (online) Retrieved from the Internet on Dec. 19, 2011 at URL>http://wiki.rlsoft.com/display/TP/The+Story+of+3.0+File+and+Folder, pp. 1-4.

* cited by examiner

*Primary Examiner* — Charles Rones
*Assistant Examiner* — Han Doan
(74) *Attorney, Agent, or Firm* — David W. Victor; Konrad, Raynes, Davda and Victor LLP

(57) ABSTRACT

Provided are a computer program product, method, and system for backing-up a volume of blocks of data in a storage system. Selection is received of selected files in a volume indicating files to backup. A determination is made from the selected files blocks in the files to backup. A volume backup map is generated indicating the determined blocks to backup. A file list of the selected files to backup and the volume backup map are stored in backup information for the backup. The blocks indicated to backup in the volume backup map are copied to a backup file on a block-by-block basis.

26 Claims, 7 Drawing Sheets

SELECTING FILES TO BACKUP IN A BLOCK LEVEL BACKUP

BACKGROUND OF THE INVENTION

1. Field of the Invention

The present invention relates to a computer program product, system, and method for selecting files to backup in a block level backup.

2. Description of the Related Art

Current backup solutions allow backing-up volumes or disks at the block level—that is, instead of copying file after file into a destination location (also referred to as a repository), blocks of data (in either disk or volume level) are copied from the disk hosting the production volume into the repository. Such backup techniques that backup data at the block level do not consider the file arrangement of the blocks because they process blocks in the volume data based on the block locations instead of the arrangement of the blocks in files. A file level backup is done at the file level by copying file after file to the repository.

Block level backup applications implement a consistent, point in time, block level copy process of the production volumes to the repository location. A consistent backup is a backup that allows a restore of a volume/disk in a consistent state, meaning all transactions, both of file system and production application, are completed. Block level backup processes include point-in-time copy which replicates data in a manner that appears instantaneous and allows a host to continue accessing the source volume while actual data transfers to the copy volume are deferred to a later time. The point-in-time copy appears instantaneous because notification of "complete" is returned to the copy operation in response to generating the relationship data structures without copying the data from the source to the target volumes. Point-in-time copy techniques, also referred to as point-in-time copies, such as the IBM FlashCopy®(FlashCopy is a registered trademark of International Business Machines, Corp. or "IBM") and snapshot, typically defer the transfer of a data block or track in the volume at the time the point-in-time copy relationship was established to the repository until a write operation is requested to that data block on the volume. Data transfers may also proceed as a background copy process with minimal impact on system performance. The point-in-time copy relationships that are immediately established in response to the point-in-time copy command include a bitmap or other data structure indicating the location of blocks in the volume at either the source volume or the copy volume.

Consistency of the backup is provided by a disk/volume-level filter kernel driver, which uses a COW (copy-on-write) technology in order to back up consistent image of volume as of the point-in-time when the backup was initiated. When an update to a block in the volume involved in a point-in-time or snapshot copy is received, then that copy of the block in the volume must be copied to the repository before the update is applied to the block in the volume. This means that the backup is "hot" and volume/disk can be in use during the backup process (which may take a long time).

SUMMARY

Provided are a computer program product, method, and system for backing-up a volume of blocks of data in a storage system. Selection is received of selected files in a volume indicating files to backup. A determination is made from the selected files blocks in the files to backup. A volume backup map is generated indicating the determined blocks to backup. A file list of the selected files to backup and the volume backup map are stored in backup information for the backup. The blocks indicated to backup in the volume backup map are copied to a backup file on a block-by-block basis.

DETAILED DESCRIPTION

Described embodiments provide techniques to allow a user to specify files to backup for use by a backup program that backs-up data on a block-by-block basis without regard to the files in which the blocks are included. In described embodiments, a volume backup map indicating blocks to backup is created by allowing a user to select files, so that the backup may then be performed on the block level either excluding or including the files the user selected. Further, a file list of files to backup is saved for use by a file system level filter to filter writes to files. The backup program may perform a block level, i.e., block-by-block, backup of blocks indicated in the volume backup map, while a file system driver may use the file list to determine how to process the blocks at a file level. In this way, the described embodiments implement a file level backup that backups up user selected files using a block level backup technique, copying blocks from the volume backup map.

Figure 1:
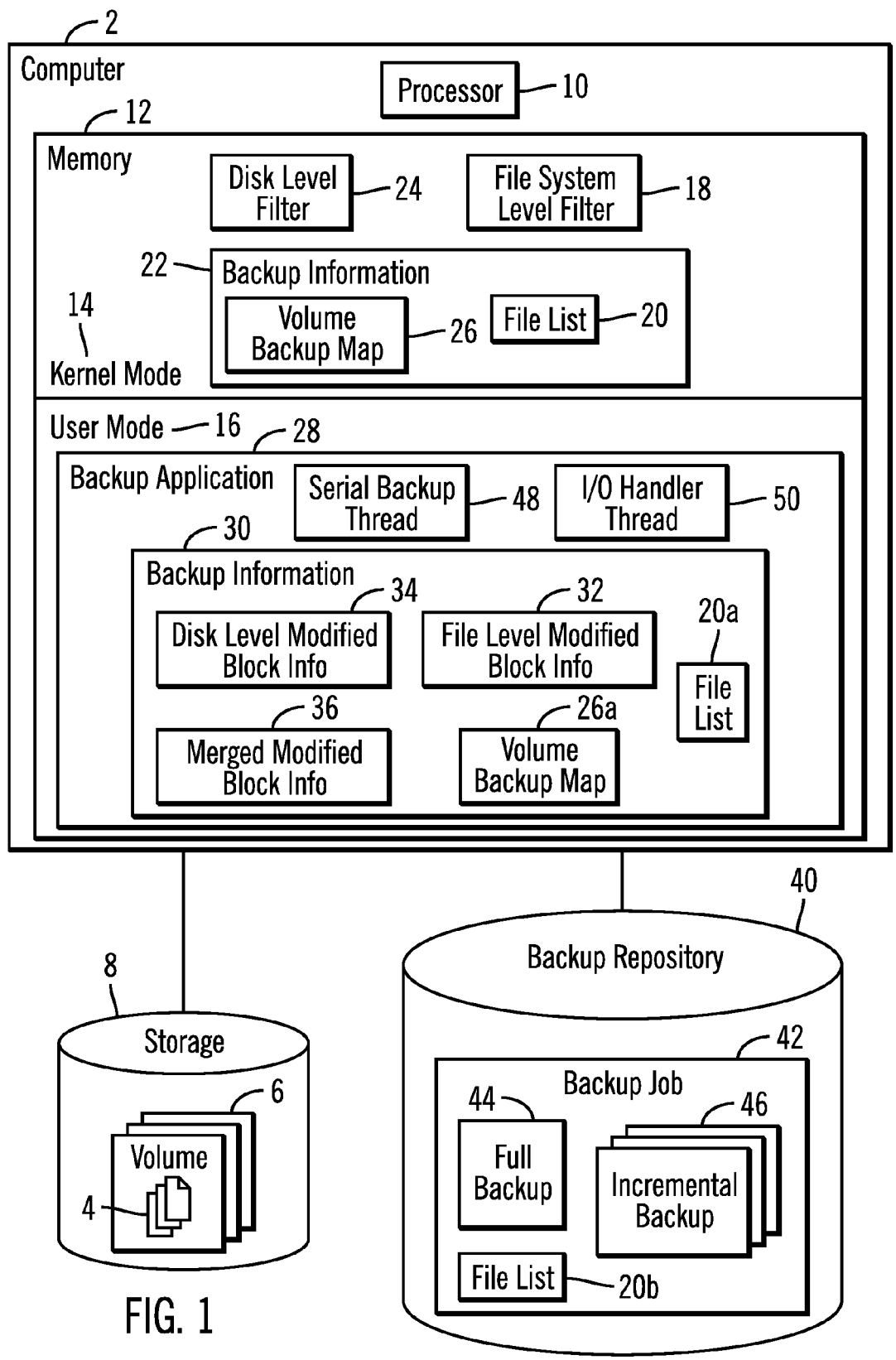
FIG. 1 illustrates an embodiment of a computing environment.

FIG. 1 illustrates an embodiment of a backup computing environment including a computer 2 that performs read and write operations with respect to files 4 in one or more volumes 6 in a storage 8. The computer 2 may receive read and write requests directed to the volumes 6 from other computers over a network (not shown). The computer 2 includes a processor 10, comprising one or more central processing units (CPUs), and a memory 12 including various programs executed by the processor 10. Programs in the memory 12 may be designated to execute in kernel mode 14 or user mode 16, where programs, tasks and threads executing in the kernel mode 14 execute at higher priority than in the user mode 16. The kernel mode 14 includes a file system level filter 18 to filter and process write requests directed to files 4 to backup indicated in a file list 20 of backup information 22 maintained for one backup job and a disk level filter 24 to filter write requests directed to blocks in one volume 6 indicated in a volume backup map 26 indicating blocks in a volume 6 subject to a backup, that are included in files 4 indicated in the file list 20. The filters 18, 24 comprise one or more programs, modules or interfaces. The file list 20 provides identifiers, pointers or other metadata for files to backup.

The user mode 16 includes a backup application 28 to perform backup and restore operations. The backup application 28 maintains backup information 30 for each backup job, which includes file level modified block information 32 indicating blocks in files including a block subject to a backup (i.e., indicated in the volume backup map 26) that have been modified, disk level modified block information 34 indicating blocks subject to the backup that have been modified; instances 20a and 26a of the file list 20 and volume backup map 26 for a backup, which may also be maintained in the backup information 22 used by the filters 18 and 24 in the kernel mode 14, and merged modified block information 36 that indicates all modified blocks subject to the backup in the disk level 34 and file level 32 modified block information.

A backup repository 40 includes information for a backup job 42 based on an instance of the backup information 30 that includes an instance of the file list 20b, a full backup 44 of the blocks included in the file list 20b having data as of a point-in-time when the backup was created, and one or more incremental backups 46 that each include files as of a point-in-time that have changed since a previous backup, full or incremental. In one embodiment, each incremental backup 46 may only include the files that have changed since a point-in-time of the immediately preceding backup. In an alternative embodiment, the incremental backup 46 may include files that have changes since the initial full backup 40. The backup repository 40 may have multiple backup jobs for different volumes 6 and sets of files 4 within the volumes 6.

The backup application 28 runs a serial backup thread 48 and an I/O (Input/Output) handler thread 50. The serial backup thread 48 performs a block level backup by backing up the volume block-by-block from the blocks indicated in the volume backup map 26a to backup or modified blocks indicated in the merged modified block information 36 created for a previous point-in-time (PIT). The Input/Output (I/O) handler thread 50 handles writes to blocks by the disk level filter 24 to perform copy-on-write-operations if a write is received to a block that is in the process of being backed-up during a creation of the full backup 44 or an incremental backup 46.

The storage 8 and backup repository 40 may be implemented in storage media in one or more storage devices known in the art, such as interconnected hard disk drives (e.g., configured as a DASD, RAID, JBOD, etc.), solid state storage devices (e.g., EEPROM (Electrically Erasable Programmable Read-Only Memory), flash memory, solid state disks (SSDs), flash disk, storage-class memory (SCM)), electronic memory, etc. The storage 8 and backup repository 40 may be implemented in the same or different storage devices. The computer 2 may connect to the storage 8 and backup repository 40 via a network connection (e.g., Intranet, Internet, Local Area Network (LAN), Storage Area Network (SAN), etc.) or via a cable or other connection.

The computer 2 may comprise a suitable computer, such as a desktop, server, laptop, tablet computer, telephony device, smart phone, mainframe, etc. The memory 12 may comprise one or more memory devices to store programs executed by the processor 10, such as a Dynamic Random Access Memory (DRAM), Random Access Memory (RAM), cache, Flash Memory, Solid State Device (SSD), etc.

The volume backup map 26, 26a, which comprises the same information at different locations, may comprise a bitmap that includes a bit for every block in the volume. A block comprises an addressable unit of storage in the volume, such as a track or logical block address (LBA). The values for each bit may indicate that the block is subject to a backup operation or be set by the serial backup thread 48 to indicate backup completed after copying the block to a backup 44, 46 in the repository 40. The volume backup map 26a used by the disk level filter 24 may not be modified, but used to determine whether a block being written is part of the backup set.

Figure 2:
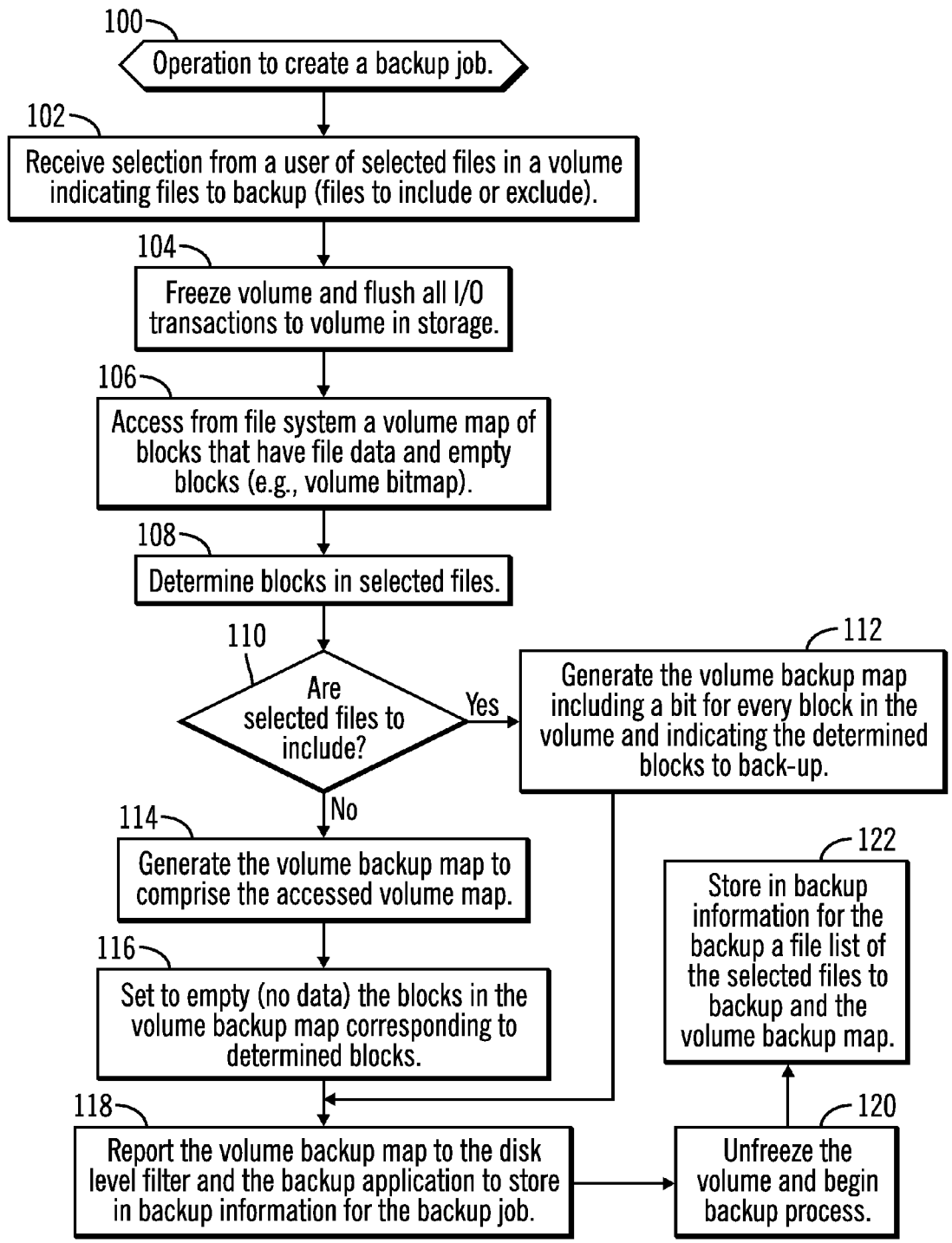
FIG. 2 illustrates an embodiment of operations to create a backup job.

FIG. 2 illustrates an embodiment of operations performed by the backup application 28 and other components in the memory 12 to prepare for creating a full block-level backup for the backup job 42. Upon initiating (at block 100) the operation to create a backup job 42 for a volume 6, the backup application 48 receives (at block 102) a selection from a user of the backup application 28 of selected files 4 in a volume 6 indicating files to backup. The selected files 4 may comprise files to include or exclude from the backup job 42. The backup application 28 freezes (at block 104) the volume and flushes all I/O transactions to the volume 6 in storage 8. The backup application 28 may access (at block 106) from the file system a volume map indicating whether each block in the volume has data or is free (e.g., a volume bitmap having a bit for each block in the volume). The backup application 28 may determine (at block 108) blocks in the selected files to backup. If (at block 110) the selected files are to include, then the backup application 28 generates (at block 112) the volume backup map 26a including a bit for every block in volume and indicating the determined blocks to back-up. If (at block 110) the selected files are to exclude from the backup of the volume 6, then the backup application 28 generates (at block 114) the volume backup map 26a to comprise the accessed volume map indicating all non-empty blocks in the volume 4 and sets (at block 116) to empty (no data) the blocks in the backup volume map corresponding to the determined blocks.

After generating the volume backup map 26a at block 112 or 116, the backup application 28 reports (at block 118) the volume backup map 26a to the disk level filter 24 to use as map 26 and stores the volume backup map 26a in the backup information 30 for the backup job. The volume is unfrozen (at block 120) and control proceeds to create a full backup of all files to backup indicated in the volume backup map 26a. The file list 20a and volume backup map 26 are stored in backup information 30 for the backup job. Further the file list 20b is also stored with the backup job.

Figure 3:
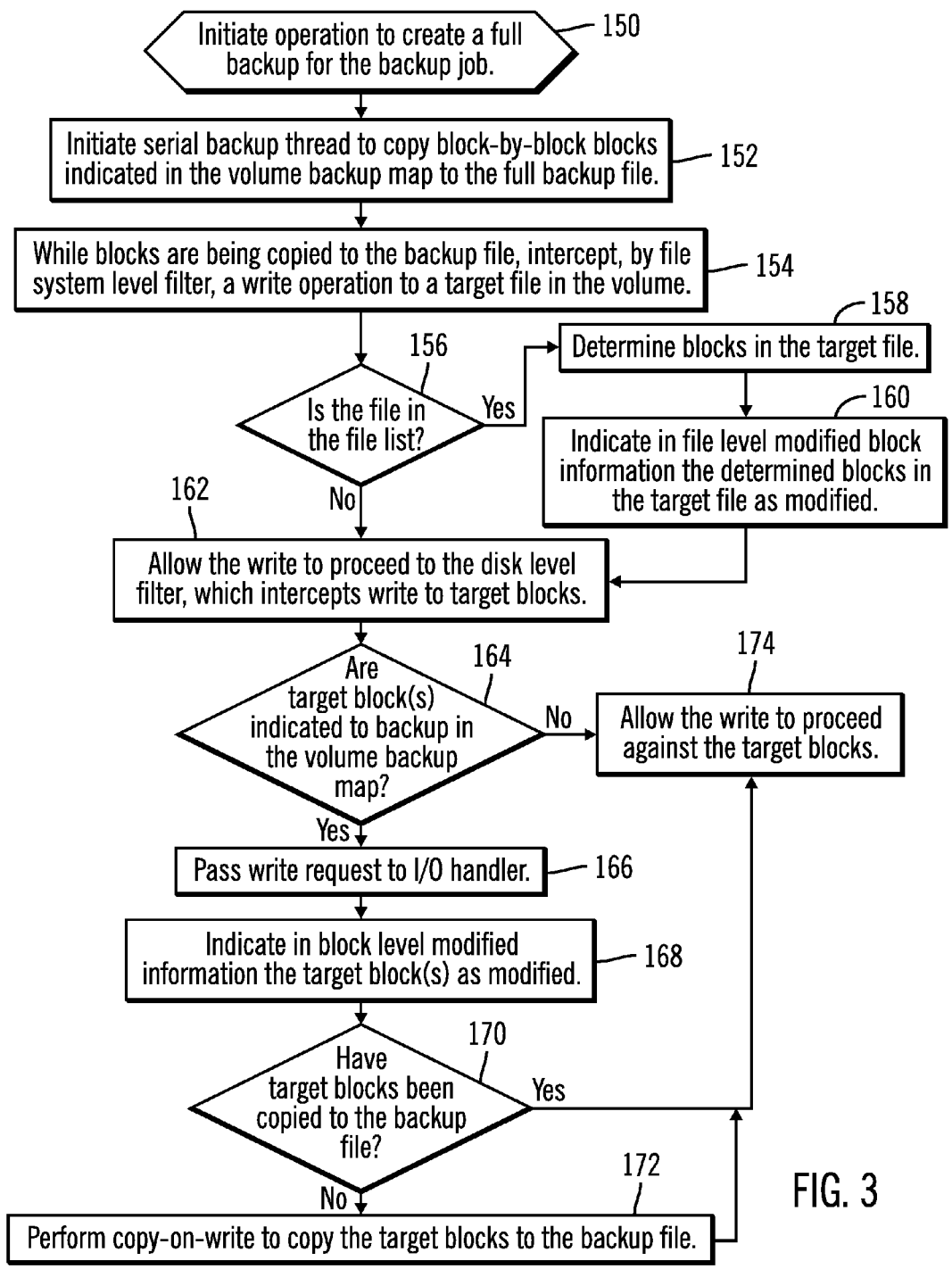
FIG. 3 illustrates an embodiment of operations to create a full backup of the volume for the backup job.

FIG. 3 illustrates an embodiment of operations performed by the components in the memory 12 to create a full backup 44 of all the selected files. Upon initiating (at block 150) the full backup, the backup application 28 initiates (at block 152) the serial backup thread 48 to copy block-by-block blocks indicated in the volume backup map 26a to the full backup file 44. While blocks are being copied to the backup file 44, the file system level filter 18 intercepts (at block 154) a write operation to a target file 4 in the volume 6. If (at block 156) the target file 4 is in the file list 20a, then the file system level filter 18 determines (at block 158) the blocks in the target file and reports the determined blocks to the backup application 28 to indicate (at block 160) as modified in the file level modified block information 32. After indicating the modified block in the file level modified block information 32 (at block 160) or if (at block 156) the target file is not in the file list 20a, then the file system level filter 18 allows (at block 162) the write to proceed to the disk level filter 24 to process. The disk level filter 24 performs a block level backup of the data.

Upon the disk level filter 24 intercepting a write to a target block, if (at block 164) the target block is indicated as in the volume backup map 26 as part of a backup job 42, then the write request is passed (at block 166) to the I/O handler 50. If (at block 170) the target blocks have not yet been copied to the full or incremental backup 44, 46 being created, then the I/O handler 50 performs (at block 172) a copy-on-write (COW) to copy the target blocks in the volume 6 for the point-in-time being created to the backup file 44, 46. If (at block 164) the target blocks are not indicated in the volume backup map 26a or after the target blocks have been copied (from the yes branch of block 170 or block 172), then the I/O handler 50 allows (at block 174) the write to proceed against the target blocks in the volume 6. At this point the block data as of the point-in-time of the backup (full or incremental) is stored in the backup file 44, 46.

Figure 4:
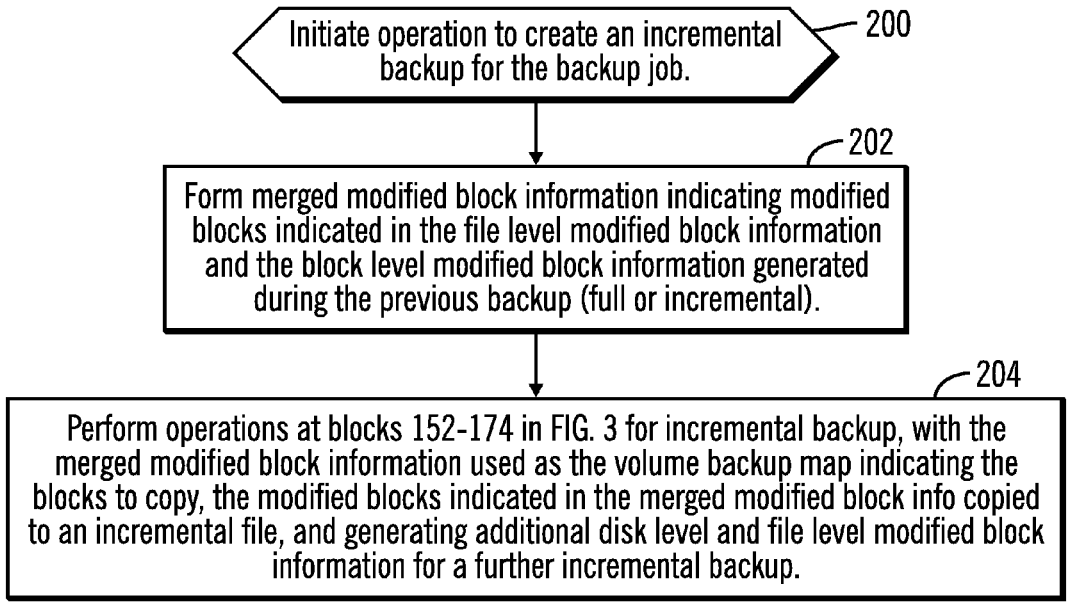
FIG. 4 illustrates an embodiment of operations to create an incremental backup for the backup job.

FIG. 4 illustrates an embodiment of operations performed by the components in the memory 12 to create an incremental backup 46 of all the selected files 4 that have changed since the last full 44 or incremental backup 46. Upon initiating (at block 200) the operation to create an incremental backup 46 for the backup job 42, the backup application 28 forms (at block 202) merged modified block information 36 indicating modified blocks indicated in the file level modified block information 32 and the disk level modified block information 34 generated during the previous backup (full or incremental). The backup application 28 then performs (at block 204) the operations at blocks 152-174 in FIG. 3 for an incremental backup, with the formed merged modified block information 36 used as the volume backup map indicating the blocks to copy. The modified blocks indicated in the merged modified block information 36 are copied to an incremental backup 46, and additional disk level 34 and file level 32 modified block information are generated of modifications received during the incremental backup 46 for use during a subsequent incremental backup.

Figure 5:
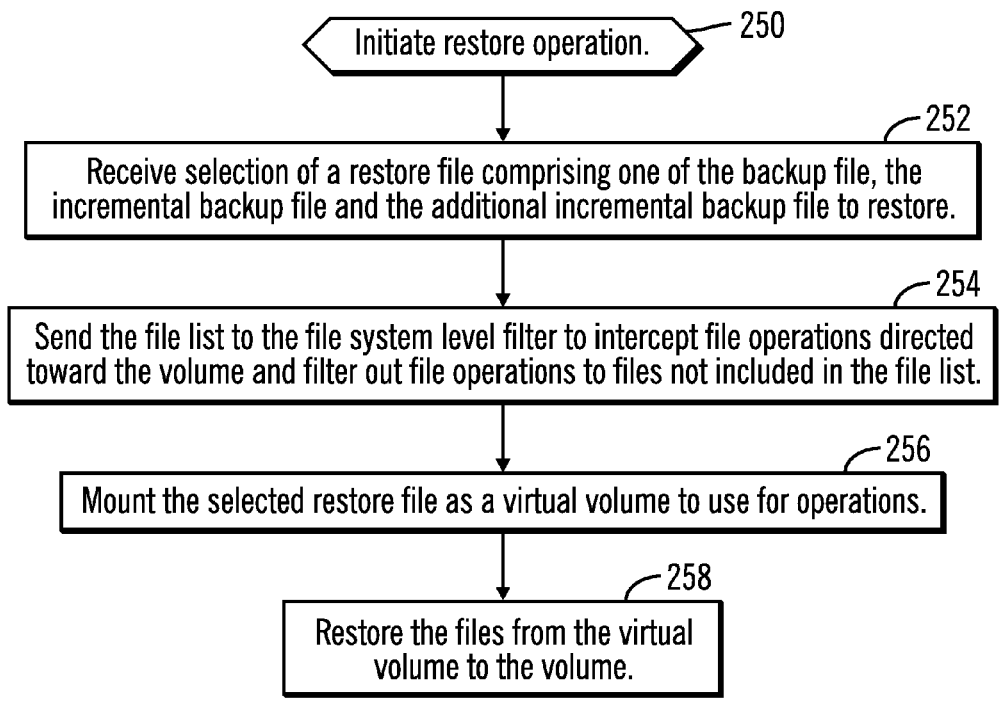
FIG. 5 illustrates an embodiment of operations to restore a volume.

FIG. 5 illustrates an embodiment of operations performed by the components in the memory 12 to initiate a restore operation. Upon initiating (at block 250) the restore, the backup application 28 receives (at block 252) selection of a restore file comprising the full backup 44 or one of the incremental backups 46 to restore. The backup application 28 sends (at block 254) the file list 20a to the file system level filter 18 to intercept file operations directed toward the volume being restored and filter out file operations to files not included in the file list 20. The backup application 28 further mounts (at block 256) the restore file as a virtual operation to use for operations and restores (at block 258) the files from the virtual volume comprising the selected full 44 or incremental backup 46 to the volume. When restoring files form a selected incremental backup, all files from the selected incremental backup and each previous backup 44 and 46 would be restored.

Figure 6:
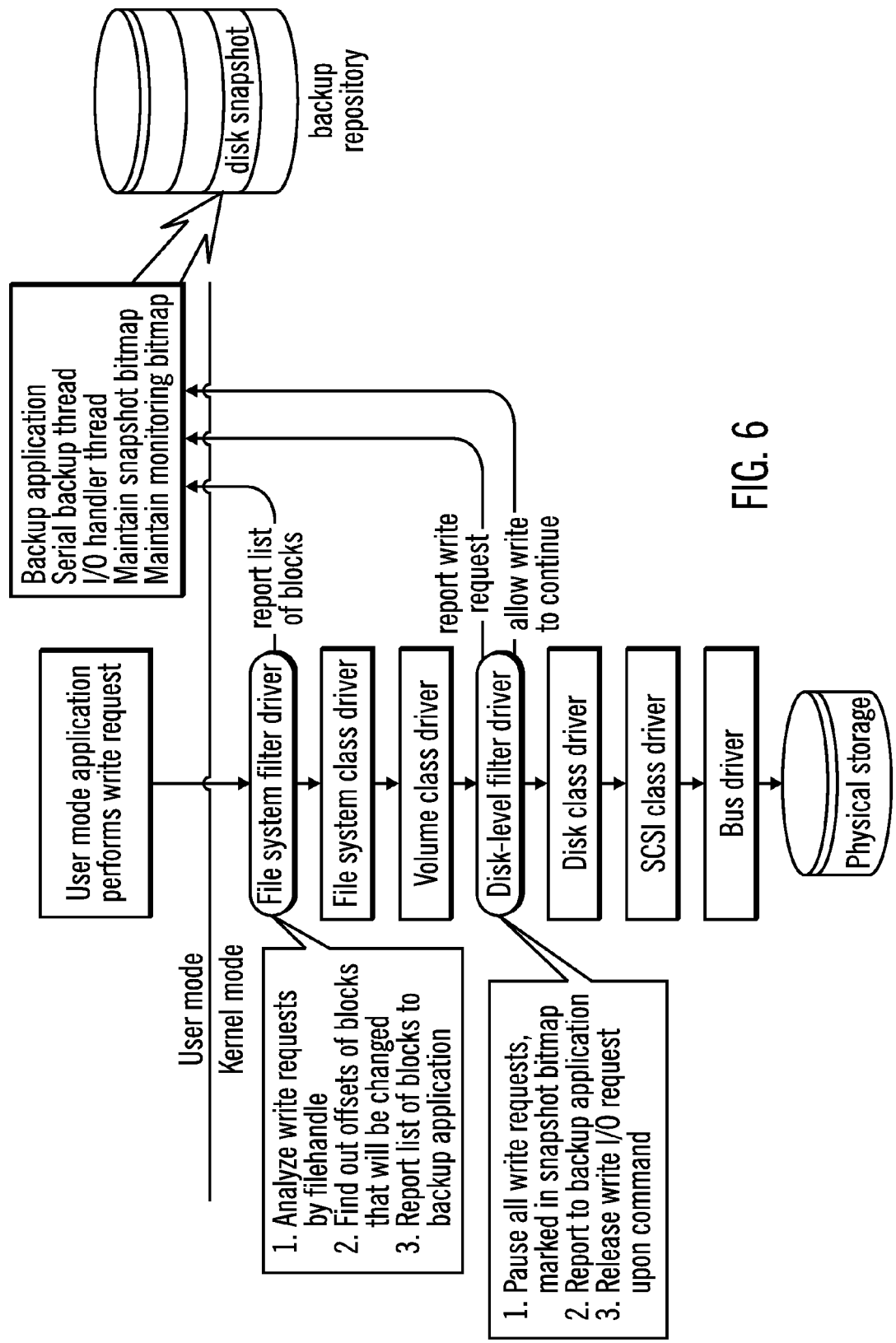
FIG. 6 illustrates an implementation of backup processes to perform a backup.

FIG. 6 illustrates an implementation of the components in the memory 12 and how the disk level filter 24 and file system level filter 18 interact with additional class drives in the kernel mode to perform operations. The file system filter driver, such as file system level filter 18, receives read and write requests from the user mode application, analyzes write requests, finds offsets of blocks that are changed, and reports list of blocks to the backup application to store to the disk snapshot. A file system class driver provides programs and methods to interact with the file system and the volume class driver provides programs and methods to interact with storage volumes. The disk level filter driver, such as disk level filter 24, pauses write requests, marks writes in the snapshot bitmap, reports writes to the backup application, and releases write requests upon command. The disk class driver provides methods and programs used by the disk level filter driver to interact with a disk driver to access storage disks, a Small Computer System Interface (SCSI) driver includes methods and programs to interact with a SCSI driver and SCSI devices, and a bus driver includes methods and programs to interact with a bus interface.

Figure 7:
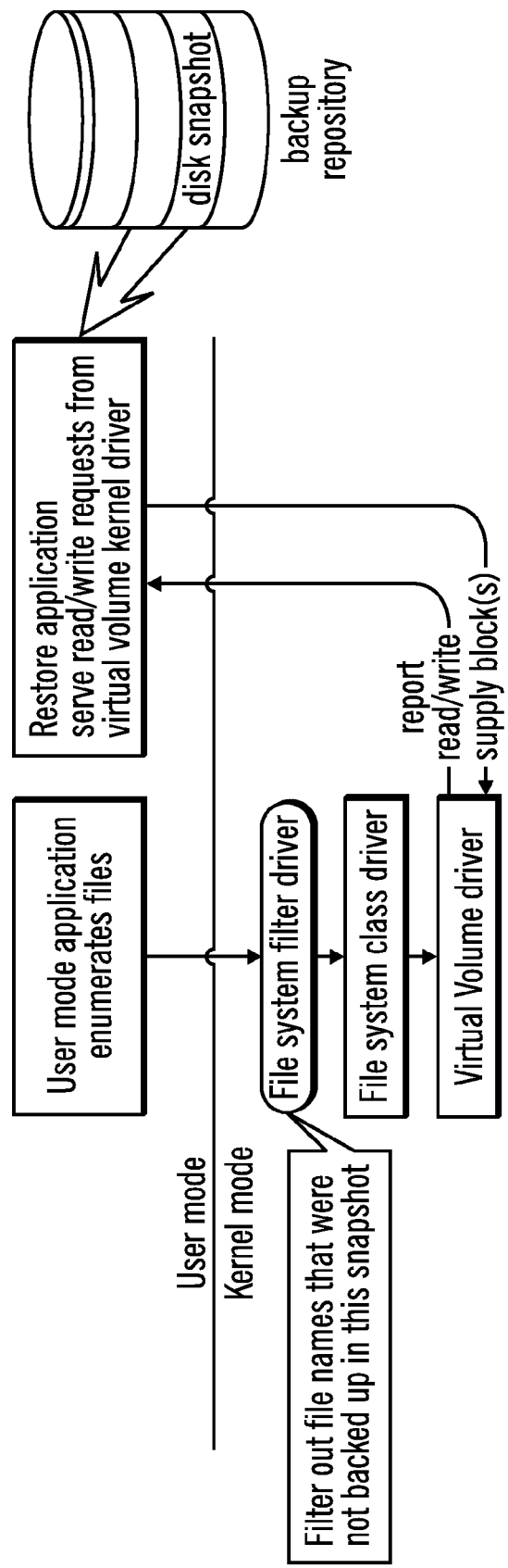
FIG. 7 illustrates an implementation of backup processes to perform a restore operation.

FIG. 7 illustrates an implementation of the file system level filter 18 and additional class drivers to interact with the application and perform the restore operation. A file system filter driver, such as file system level filter 18, filters out file names that were not backed up in the snapshot and interacts with a file system class driver and virtual volume driver. The file system class driver provides programs and methods to interact with a file system and the virtual volume driver provides programs and methods to interact with a virtual volume.

With described embodiments a user may select files to be subject to a block level backup. In described embodiments, a volume backup map indicating blocks to backup is created by indicating blocks in files the user selected to backup to provide for a block-by-block backup of a volume of only the blocks in the user selected files. Further, to ensure that all blocks in files that are updated may be copied over in a next incremental backup, file level modified block information is maintained indicating blocks in files in the file list that are updated while the blocks indicated in the volume backup map are in process of being copied to the backup volume or between backups and block level modified block information is maintained indicating blocks indicated in the volume backup map updated while the blocks indicated in the volume backup map are in process of being copied to the backup volume or between backups. The block level and file level modified block information indicating modified blocks may be merged to use to provide the map of blocks to copy to a next incremental backup. In this way, a user may select files to backup for a backup program that performs block level backup operations.

Further, the described embodiments provide for incremental hot backups comprising backups that can be performed without service interruption, so that the files that are backed-up are fully available to production applications during the production process. For instance, the file level modified block information indicates blocks in files that are updated while being copied to the backup volume or between volumes and file level writes are allowed to proceed while the full backup and incremental backups are being formed. With the described embodiment, writes are allowed to proceed against the files specified in the backup after a copy-on-write is performed to move the older version of the data as of the point-in-time of the incremental or full backup being taken or previously performed.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 8:
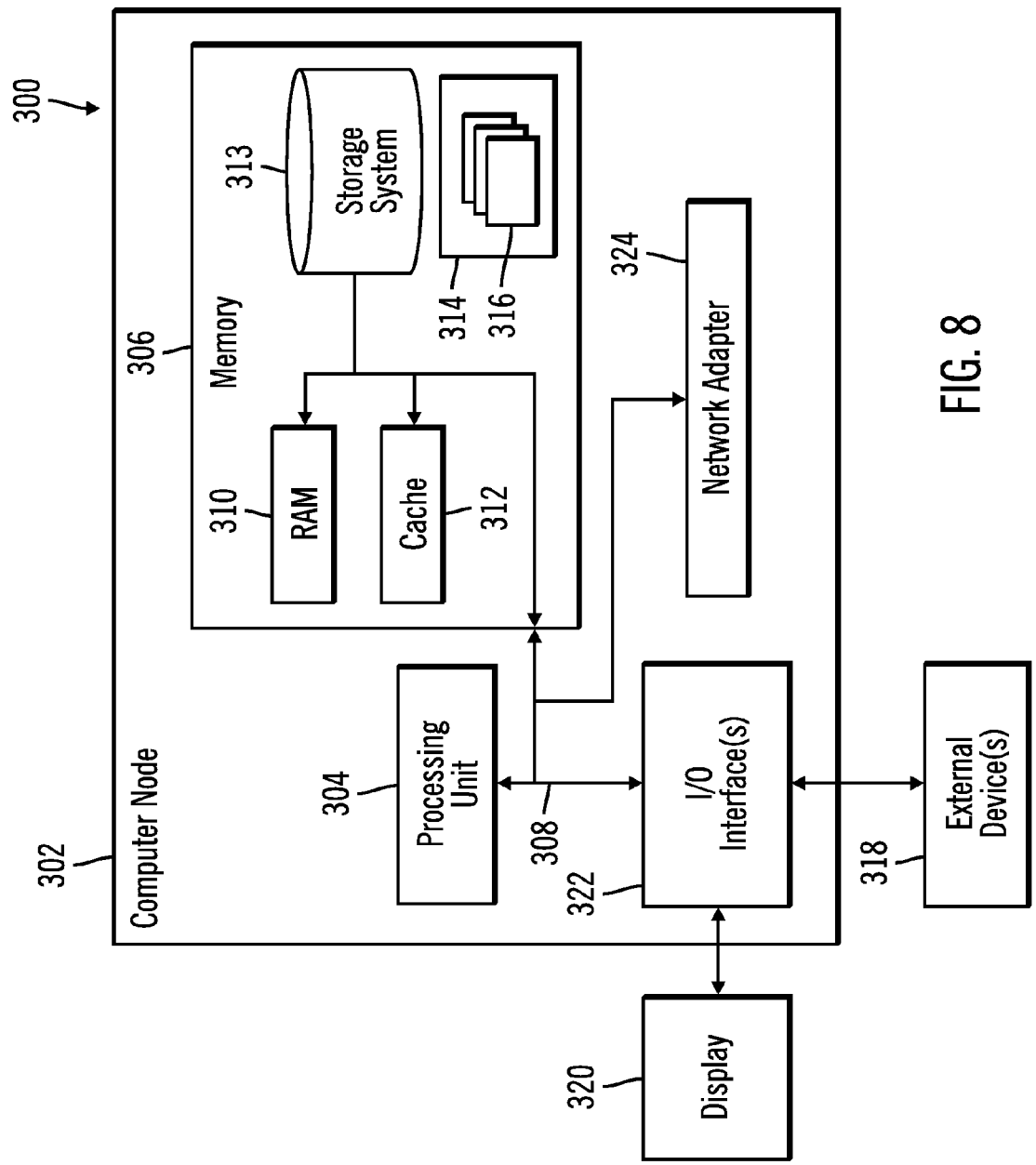
FIG. 8 illustrates an embodiment of a computing environment.

The components of the computer 2, such as the components 18, 24, 28, 48, and 50 may be implemented as one or more program modules in one or more computer systems, such as the computer system 302 shown in FIG. 8. Computer system/server 302 may be described in the general context of computer system executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 302 is shown in the form of a general-purpose computing device. The components of computer system/server 302 may include, but are not limited to, one or more processors or processing units 304, a system memory 306, and a bus 308 that couples various system components including system memory 306 to processor 304. Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 316 which generally carry out the functions and/or methodologies of embodiments of the invention as described herein. The components 18, 24, 28, 48, and 50 of the computing environment 2 may be implemented in one or more computer systems 302, where if they are implemented in multiple computer systems 302, then the computer systems may communicate over a network.

Computer system/server 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for backing-up a volume of blocks of data in a storage system, wherein the computer program product comprises a non-transitory computer readable storage medium having computer readable program code embodied therein that executes to perform operations, the operations comprising:

receiving selection of selected files in a volume indicating files to backup;

determining from the selected files blocks in the files to backup;

generating a volume backup map indicating the determined blocks to backup;

storing in backup information for the backup a file list of the selected files to backup and the volume backup map;

copying the blocks indicated to backup in the volume backup map to a backup file on a block-by-block basis;

while the blocks are being copied, intercepting a write operation to a target file;

determining whether the target file is in the file list;

indicating in file level modified block information target blocks in the target file as modified in response to determining that the target file is in the file list;

determining whether the target blocks are indicated in the volume backup map;

allowing the write operation to proceed to a filter to determine whether to allow the write operation to proceed to the blocks in the target file in response to indicating the modified blocks in the file level modified block information; and allowing the write operation to proceed against the target blocks in response to determining that the target blocks in the target file to which the write operation is directed are not indicated in the volume backup map.

2. The computer program product of claim 1, wherein the volume backup map comprises a bitmap having a bit for each block in the volume, wherein indicating the determined blocks to backup comprises setting the bits for the determined blocks to a first value indicating to backup and setting the bits for blocks not comprising the determined blocks to indicate to not back-up.

3. The computer program product of claim 1, wherein the selected files comprise at least one of files to include in the backup and files to exclude from the backup.

4. The computer program product of claim 1, wherein the operations further comprise:
  intercepting by the filter the write to the target block allowed to proceed;
  determining whether the target block was copied to the backup file;
  copying data for the target block in the volume to the backup file in response to determining that the target block was not copied to the backup file;
  writing the write to the target block in the volume after copying the data for the target block to the backup file; and
  indicating in block level modified information the target block.

5. The computer program product of claim 1, wherein the operations further comprise:
  maintaining block level modified block information indicating blocks indicated in the volume backup map updated while the blocks indicated in the volume backup map are in process of being copied to the backup volume or between backups; and
  forming merged modified block information indicating modified blocks indicated in the file level modified block information and the block level modified block information.

6. The computer program product of claim 5, wherein the operations further comprise:
  initiating an incremental backup operation to copy the blocks indicated as modified in the merged modified block information to an incremental backup file;
  maintaining additional file level modified block information indicating blocks in files in the file list that are updated while the blocks indicated in the merged modified block information are being copied to the incremental backup file;
  maintaining additional block level modified block information indicating blocks indicated in the volume backup map that are updated while the blocks indicated in the merged modified block information are being copied to the incremental backup file; and
  forming additional merged modified block information indicating modified blocks indicated in the file level modified block information and the block level modified block information.

7. The computer program product of claim 5, wherein the operations further comprise
  initiating an additional incremental backup operation to copy the blocks indicated as modified in additional merged modified block information to an additional incremental backup file.

8. The computer program product of claim 7, wherein the operations comprise:
  receiving selection of a restore file comprising one of the backup file, the incremental backup file and the additional incremental backup file to restore;
  mount the restore file as the volume to use for operations;
  providing a file system filter the file list to cause the file system filter to intercept file operations directed toward the volume and filter out file operations to files not included in the file list; and
  restore the volume from the selected restore file.

9. A system for backing-up a volume of blocks of data in a storage system, comprising:
  a processor;
  a memory;
  a computer readable storage medium storing computer readable program code embodied executed by the processor to perform operations, the operations comprising:
    receiving selection of selected files in a volume indicating files to backup;
    determining from the selected files blocks in the files to backup;
    generating a volume backup map in the memory indicating the determined blocks to backup;
    storing in backup information for the backup in the memory a file list of the selected files to backup and the volume backup map;
    copying the blocks indicated to backup in the volume backup map to a backup file on a block-by-block basis;
    while the blocks are being copied, intercepting a write operation to a target file;
    determining whether the target file is in the file list;
    indicating in file level modified block information target blocks in the target file as modified in response to determining the target file is in the file list;
    determining whether the target blocks are indicated in the volume backup map;
    allowing the write operation to proceed to a filter to determine whether to allow the write operation to proceed to the blocks in the target file in response to indicating the modified blocks in the file level modified block information; and
    allowing the write operation to proceed against the target blocks in response to determining that the target blocks in the target file to which the write operation is directed are not indicated in the volume backup map.

10. The system of claim 9, wherein the selected files comprise at least one of files to include in the backup and files to exclude from the backup.

11. The system of claim 9, wherein the operations further comprise:
  maintaining block level modified block information in the memory indicating blocks indicated in the volume backup map updated while the blocks indicated in the volume backup map are in process of being copied to the backup volume or between backups; and
  forming merged modified block information in the memory indicating modified blocks indicated in the file level modified block information and the block level modified block information.

12. The system of claim 11, wherein the operations further comprise:
  initiating an incremental backup operation to copy the blocks indicated as modified in the merged modified block information to an incremental backup file;
  maintaining additional file level modified block information in the memory indicating blocks in files in the file list that are updated while the blocks indicated in the merged modified block information are being copied to the incremental backup file;
  maintaining additional block level modified block information in the memory indicating blocks indicated in the volume backup map that are updated while the blocks indicated in the merged modified block information are being copied to the incremental backup file; and forming additional merged modified block information in the memory indicating modified blocks indicated in the file level modified block information and the block level modified block information.

13. The system of claim 11, wherein the operations further comprise initiating an additional incremental backup operation to copy the blocks indicated as modified in additional merged modified block information to an additional incremental backup file.

14. The system of claim 13, wherein the operations comprise:

receiving selection of a restore file comprising one of the backup file, the incremental backup file and the additional incremental backup file to restore;

mount the restore file as the volume to use for operations;

providing a file system filter in the memory the file list to cause the file system filter to intercept file operations directed toward the volume and filter out file operations to files not included in the file list; and restore the volume from the selected restore file.

15. A method for backing-up a volume of blocks of data in a storage system, comprising:

receiving selection of selected files in a volume indicating files to backup;

determining from the selected files blocks in the files to backup;

generating a volume backup map indicating the determined blocks to backup;

storing in backup information for the backup a file list of the selected files to backup and the volume backup map;

copying the blocks indicated to backup in the volume backup map to a backup file on a block-by-block basis;

while the blocks are being copied, intercepting a write operation to a target file;

determining whether the target file is in the file list;

indicating in file level modified block information target blocks in the target file as modified in response to determining the target file is in the file list; and determining whether the target blocks are indicated in the volume backup map;

allowing the write operation to proceed to a filter to determine whether to allow the write operation to proceed to the blocks in the target file in response to indicating the modified blocks in the file level modified block information; and allowing the write operation to proceed against the target blocks in response to determining that the target blocks in the target file to which the write operation is directed are not indicated in the volume backup map.

16. The method of claim 15, wherein the selected files comprise at least one of files to include in the backup and files to exclude from the backup.

17. The method of claim 15, further comprising:

maintaining block level modified block information indicating blocks indicated in the volume backup map updated while the blocks indicated in the volume backup map are in process of being copied to the backup volume or between backups; and forming merged modified block information indicating modified blocks indicated in the file level modified block information and the block level modified block information.

18. The method of claim 17, further comprising:

initiating an incremental backup operation to copy the blocks indicated as modified in the merged modified block information to an incremental backup file;

maintaining additional file level modified block information indicating blocks in files in the file list that are updated while the blocks indicated in the merged modified block information are being copied to the incremental backup file;

maintaining additional block level modified block information indicating blocks indicated in the volume backup map that are updated while the blocks indicated in the merged modified block information are being copied to the incremental backup file; and forming additional merged modified block information indicating modified blocks indicated in the file level modified block information and the block level modified block information.

19. The method of claim 17, further comprising:

initiating an additional incremental backup operation to copy the blocks indicated as modified in additional merged modified block information to an additional incremental backup file.

20. The method of claim 19, further comprising:

receiving selection of a restore file comprising one of the backup file, the incremental backup file and the additional incremental backup file to restore;

mount the restore file as the volume to use for operations;

providing a file system filter the file list to cause the file system filter to intercept file operations directed toward the volume and filter out file operations to files not included in the file list; and restore the volume from the selected restore file.

21. The computer program product of claim 1, wherein the operations further comprise:

in response to determining that the target blocks are indicated in the volume backup map, indicating in block level modified information the target blocks as modified; and initiating an incremental backup to backup the target blocks indicated as changed in the file level modified block information and the block level modified information.

22. The system of claim 9, wherein the operations further comprise:

in response to determining that the target blocks are indicated in the volume backup map, indicating in block level modified information the target blocks as modified; and initiating an incremental backup to backup the target blocks indicated as changed in the file level modified block information and the block level modified information.

23. The method of claim 15, further comprising:

in response to determining that the target blocks are indicated in the volume backup map, indicating in block level modified information the target blocks as modified; and initiating an incremental backup to backup the target blocks indicated as changed in the file level modified block information and the block level modified information.

24. The computer program product of claim 1, wherein the determination of whether the target blocks are indicated in the volume backup map are performed after determining whether the target file is in the file list.

25. The system of claim 9, wherein the determination of whether the target blocks are indicated in the volume backup map are performed after determining whether the target file is in the file list.

26. The method of claim 15, wherein the determination of whether the target blocks are indicated in the volume backup map are performed after determining whether the target file is in the file list.

* * * * *